US008266108B2

(12) United States Patent
Araki et al.

(10) Patent No.: US 8,266,108 B2
(45) Date of Patent: Sep. 11, 2012

(54) MEDIUM DRIVE APPARATUS, OPERATION METHOD FOR MEDIUM DRIVE APPARATUS, INFORMATION PROCESSING APPARATUS, RECORDING AND REPRODUCTION ACCESSING METHOD FOR INFORMATION PROCESSING APPARATUS, PROGRAM, AND PROGRAM RECORDING MEDIUM

(75) Inventors: Takahiro Araki, Kanagawa (JP); Koji Inoue, Tokyo (JP); Toshihisa Iriyama, Kanagawa (JP)

(73) Assignee: Sony Corporation (JP)

( * ) Notice: Subject to any disclaimer, the term of this patent is extended or adjusted under 35 U.S.C. 154(b) by 707 days.

(21) Appl. No.: 11/977,159

(22) Filed: Oct. 23, 2007

(65) Prior Publication Data

US 2008/0154839 A1    Jun. 26, 2008

(30) Foreign Application Priority Data

Oct. 25, 2006  (JP) ................ P2006-289910

(51) Int. Cl.
*G06F 7/00* (2006.01)
(52) U.S. Cl. ...................... 707/657; 707/784
(58) Field of Classification Search ............. 707/657, 707/781, 913, 914, 915, 916, 999.01; 380/270; 713/193, 168, 2, 189; 369/53.21; 386/125
See application file for complete search history.

(56) References Cited

U.S. PATENT DOCUMENTS

| | | | |
|---|---|---|---|
| 6,467,005 B1 | 10/2002 | Ito et al. | |
| 6,775,768 B1 * | 8/2004 | Raspe | 713/2 |
| 6,832,276 B2 | 12/2004 | Shigenobu | |
| 2003/0007640 A1 * | 1/2003 | Harada et al. | 380/270 |
| 2003/0084295 A1 | 5/2003 | Xie et al. | |
| 2003/0231567 A1 * | 12/2003 | Moritomo | 369/53.21 |
| 2003/0233559 A1 * | 12/2003 | Asano et al. | 713/189 |
| 2005/0105735 A1 * | 5/2005 | Iino et al. | 380/277 |
| 2005/0160284 A1 | 7/2005 | Kitani et al. | |
| 2005/0188167 A1 * | 8/2005 | Squibbs et al. | 711/163 |
| 2006/0210074 A1 * | 9/2006 | Ryu | 380/54 |
| 2006/0294262 A1 * | 12/2006 | Su | 710/13 |
| 2007/0031127 A1 * | 2/2007 | Ohhashi | 386/125 |
| 2007/0226399 A1 * | 9/2007 | So et al. | 711/101 |

FOREIGN PATENT DOCUMENTS

| | | |
|---|---|---|
| JP | 2003233538 A | 8/2003 |
| JP | 2004-070875 A | 3/2004 |
| JP | 2004086337 A | 3/2004 |

OTHER PUBLICATIONS

Office Action from Japanese Application No. 2006-289910, dated Dec. 7, 2010.

* cited by examiner

*Primary Examiner* — Hung T Vy
(74) *Attorney, Agent, or Firm* — Lerner, David, Littenberg, Krumholz & Mentlik, LLP

(57) ABSTRACT

Disclosed herein is a medium drive apparatus connected to an information processing apparatus for performing recording and reproduction on and from a recording medium in accordance with a request from the information processing apparatus, which may include an inputting and outputting section configured to record and reproduce data on and from a recording medium, and a control section configured to execute a first operation process as a reproduction only mode, a second operation process as a recording and reproduction mode, an authentication process with the information processing apparatus, and a mode changing process of changing the operation mode from the reproduction only mode to the recording and reproduction mode in response to success in the authentication by the authentication process thereby to control the recording operation and the reproduction operation of the inputting and outputting section.

4 Claims, 7 Drawing Sheets

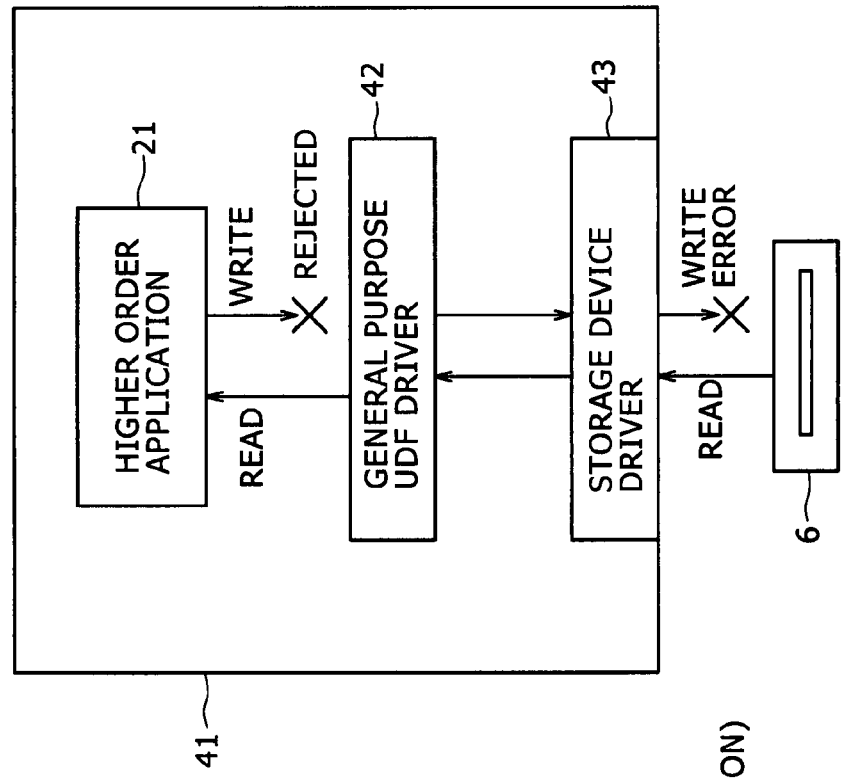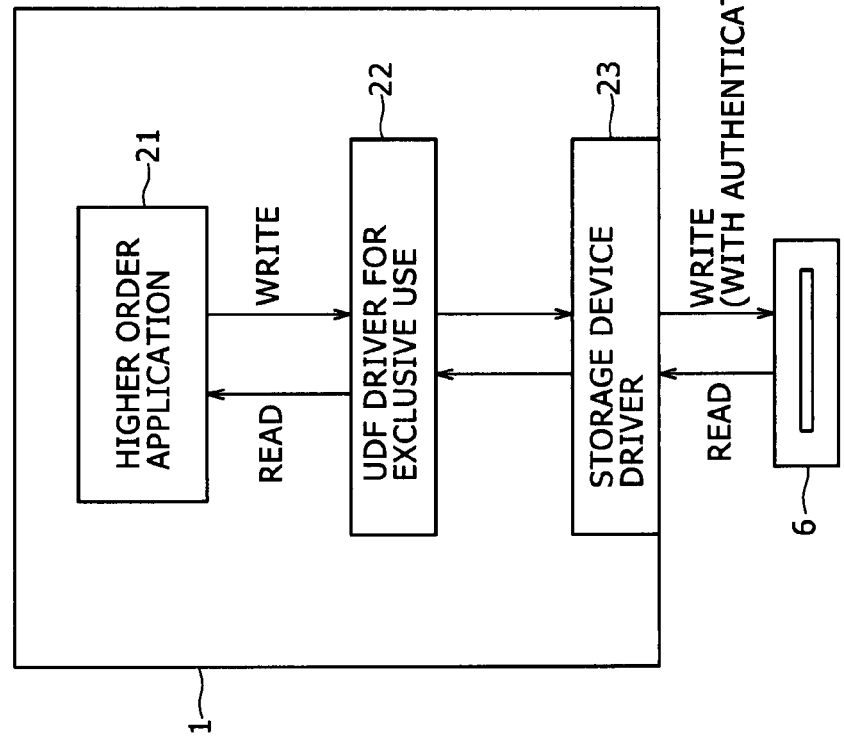

MEDIUM DRIVE APPARATUS, OPERATION METHOD FOR MEDIUM DRIVE APPARATUS, INFORMATION PROCESSING APPARATUS, RECORDING AND REPRODUCTION ACCESSING METHOD FOR INFORMATION PROCESSING APPARATUS, PROGRAM, AND PROGRAM RECORDING MEDIUM

CROSS-REFERENCE TO RELATED APPLICATIONS

This application claims priority from Japanese Patent Application No. JP 2006-289910 filed in the Japanese Patent Office on Oct. 25, 2006, the entire content of which is incorporated herein by reference.

BACKGROUND OF THE INVENTION

1. Field of the Invention

This invention relates to a medium drive apparatus, an operation method for a medium drive apparatus, an information processing apparatus, a recording and reproduction accessing method for an information processing apparatus, a program and a program recording medium. The present invention can be applied to computer systems and so forth which use a medium drive apparatus such as a disk drive which performs recording and reproduction on and from a recording medium such as, for example, an optical disk.

2. Description of the Related Art

A system is known and disclosed, for example, in U.S. Pat. No. 6,832,276 wherein an optical disk drive is connected to a personal computer such that the personal computer accesses an optical disk loaded in the optical disk drive.

Generally, in a computer system to which a medium drive apparatus is connected in this manner, software activated on the personal computer side makes it possible to execute a recording access and a reproduction access to an optical disk or a like disk loaded in the medium drive apparatus.

A system wherein a drive for a writable DVD (Digital Versatile Disc) is connected to a personal computer by a USB (Universal Serial Bus) or an ATA (Attachment) is taken as an example.

In the system described, the (software of) the personal computer side first acquires information of a medium loaded currently and a write characteristic which relies upon the medium and the drive. Then, writing software of the personal computer side can perform a recording access based on the acquired information to write information in a free format.

SUMMARY OF THE INVENTION

Here, another medium drive is considered which accepts a removable medium of a particular type (portable recording medium) and can be connected to a personal computer.

Further, it is assumed to restrict the format of a file system and so forth to be used for writing into a removable medium of the particular type by the medium drive to a certain predetermined format. This is a case wherein, for example, the removable medium is designed for common use with a different system such as a video cameral system and, since the common usability is lost if recording is performed in a different format, it is demanded to restrict the format for the removable medium to the predetermined format.

However, according to a method similar to that of a general-purpose DVD drive, the format used for writing on the medium drive apparatus side may not be restricted. Therefore, it is difficult to assure the compatibility between the medium and the format used for writing in the medium.

Meanwhile, if the predetermined format used for writing in the particular medium allows reading out, for example, also by a general-purpose UDF (Universal Disc Format) file system driver, then also in order to keep a wide operation environment of the personal computer side, it is desired to make it possible to perform, also in an environment wherein a UDF file system driver for exclusive use is not installed, reproduction if a general purpose UDF file system driver is installed.

Further, it is demanded to implement a system wherein, for example, a predetermined format is used for writing on a particular medium while making it possible to execute reproduction of data of a medium by means of a general-purpose driver which is not compatible with the predetermined format.

According to an embodiment of the present invention, there is provided a medium drive apparatus connected to an information processing apparatus for performing recording and reproduction on and from a recording medium in accordance with a request from the information processing apparatus, which may include an inputting and outputting section configured to record and reproduce data on and from a recording medium, and a control section configured to execute a first operation process as a reproduction only mode wherein a reproduction operation for the recording medium in accordance with a reproduction request from the information processing apparatus is executed but a recording operation on the recording medium in accordance with a recording request from the information processing apparatus is not executed, a second operation process as a recording and reproduction mode wherein a reproduction operation and a recording operation from and on the recording medium in accordance with a reproduction request and a recording request from the information processing apparatus are executed, an authentication process with the information processing apparatus, and a mode changing process of changing the operation mode from the reproduction only mode to the recording and reproduction mode in response to success in the authentication by the authentication process to control the recording operation and the reproduction operation of the inputting and outputting section.

Where the recording medium is a portable recording medium, the control section may execute the first operation process in response to loading of the portable recording medium.

According to another embodiment of the present invention, there is provided an operation method for a medium drive apparatus connected to an information processing apparatus for performing recording and reproduction on and from a recording medium in accordance with a request from the information processing apparatus, which may include performing an operation as a reproduction only mode wherein a reproduction operation for the recording medium in accordance with a reproduction request from the information processing apparatus is executed but a recording operation on the recording medium in accordance with a recording request from the information processing apparatus is not executed, performing an authentication process with the information processing apparatus, and changing the operation mode from the reproduction only mode to the recording and reproduction mode in response to success in the authentication by the authentication process to perform the recording operation and the reproduction operation on and from the recording medium in accordance with the reproduction request and the recording request from the information processing apparatus.

According to a further embodiment of the present invention, there are provided an operation program for causing the operation method to be performed by the medium driving apparatus and a program recording medium on which the operation program is recorded.

According to a still further embodiment of the present invention, there is provided an information processing apparatus for performing a recording access and a reproduction access to a medium drive apparatus connected to the information processing apparatus, which may include a control section configured to perform an authentication process with the medium drive apparatus and execute a recording access and a reproduction access to the medium drive apparatus when a condition of success in the authentication is satisfied.

According to a yet further embodiment of the present invention, there is provided a recording and reproduction accessing method for an information processing apparatus for performing a recording access and a reproduction access to a medium drive apparatus connected to the information processing apparatus, which may include performing an authentication process with the medium drive apparatus, and executing a recording access and a reproduction access to the medium drive apparatus when a condition of success in the authentication is satisfied.

According to a yet further embodiment of the present invention, there are provided an operation program for causing the recording and reproduction accessing method to be performed by the information processing apparatus and a program recording medium on which the operation program is recorded.

Thus, in the present invention, the medium drive apparatus which may be an optical disk drive and the like may perform an authentication process with the information processing apparatus which is a host apparatus such as a personal computer.

The authentication process may be executed between the medium drive apparatus and a driver which uses a predetermined format to perform recording on a particular medium (that is, software as a file system driver of the information processing apparatus side). If this is viewed from the medium drive apparatus side, the process may confirm whether or not the information processing apparatus side can use the predetermined format to perform a recording access.

Then, the medium drive apparatus may operate in the reproduction only mode unless an authentication process is performed. Then, if the authentication process results in success, then the operation mode of the medium drive apparatus may change from the reproduction only mode to the recording and reproduction mode, in which the medium drive apparatus can accept a recording access.

The information processing apparatus of the present invention is configured as an information processing apparatus which may include a file system driver which uses a predetermined format to perform a recording access to a particular medium. In this instance, the information processing apparatus may perform an authentication process with the medium drive apparatus and may execute, if the authentication process results in success, a recording access to the medium drive apparatus.

According to the present embodiment, the medium drive apparatus may operate in the reproduction only mode unless authentication results in success, but may operate in the recording and reproduction mode after the authentication results in success. Therefore, where the information processing apparatus is provided with a file system driver which uses the predetermined format to perform a recording access to the particular medium, it may perform a recording operation. On the other hand, where the information processing apparatus is provided with a general-purpose file system driver which does not use the predetermined format to perform a recording access, it may perform a reproduction operation.

Accordingly, there is an effect that the format of information to be written on a recording medium loaded in the medium drive apparatus may be specified.

Further, even the information processing apparatus which incorporates a general-purpose file system driver may be used to perform a reproduction access to a recording medium and read out data of the recording medium.

With the programs and the program recording media, the medium drive apparatus, operation method for a medium drive apparatus, information processing apparatus and recording and reproduction accessing method for an information processing apparatus according to the present embodiment can be implemented.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 7A and 7B are diagrammatic views illustrating functions of different information processing apparatus connected to the optical disk drive.

DETAILED DESCRIPTION

Figure 1:
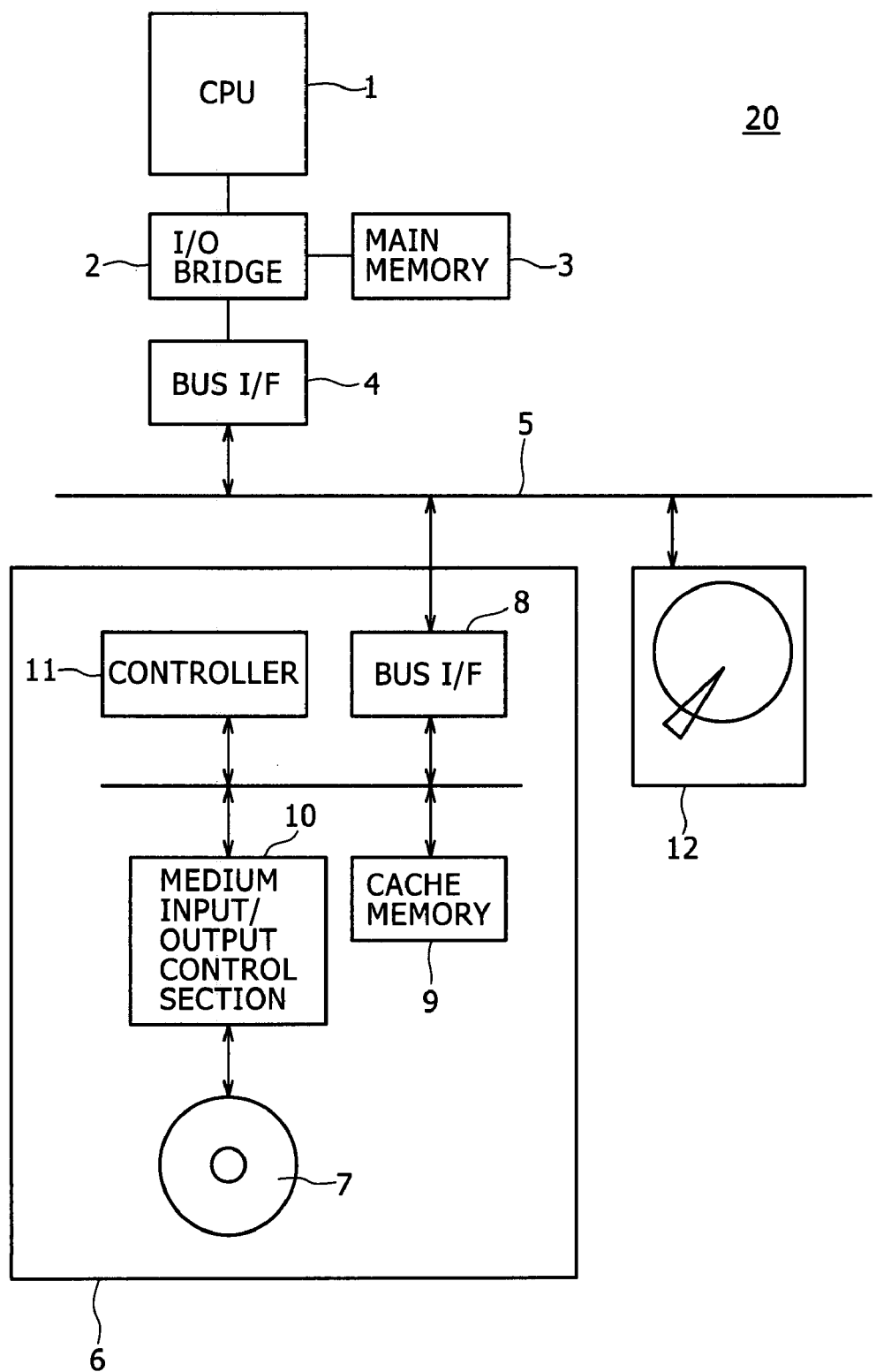
FIG. 1 is a block diagram of an information processing system to which the present embodiment is applied.

Referring first to FIG. 1, there is shown an example of a configuration of an information processing system 20 to which the present invention is applied. The information processing system 20 may be applied widely not only as a computer system but also as an AV (Audio Visual) system or a medium recording and/or reproduction system.

The information processing system 20 shown in FIG. 1 includes a CPU (central processing unit) 1, an I/O (input/output) bridge 2, a main memory 3, a bus interface 4, an ATA bus 5, an optical disk drive 6 and a hard disk drive 12.

In the information processing system 20, the optical disk drive 6 corresponds to an embodiment of the present invention of a medium drive apparatus, and the other components correspond to an embodiment of the present invention of an information processing apparatus.

Figure 4:
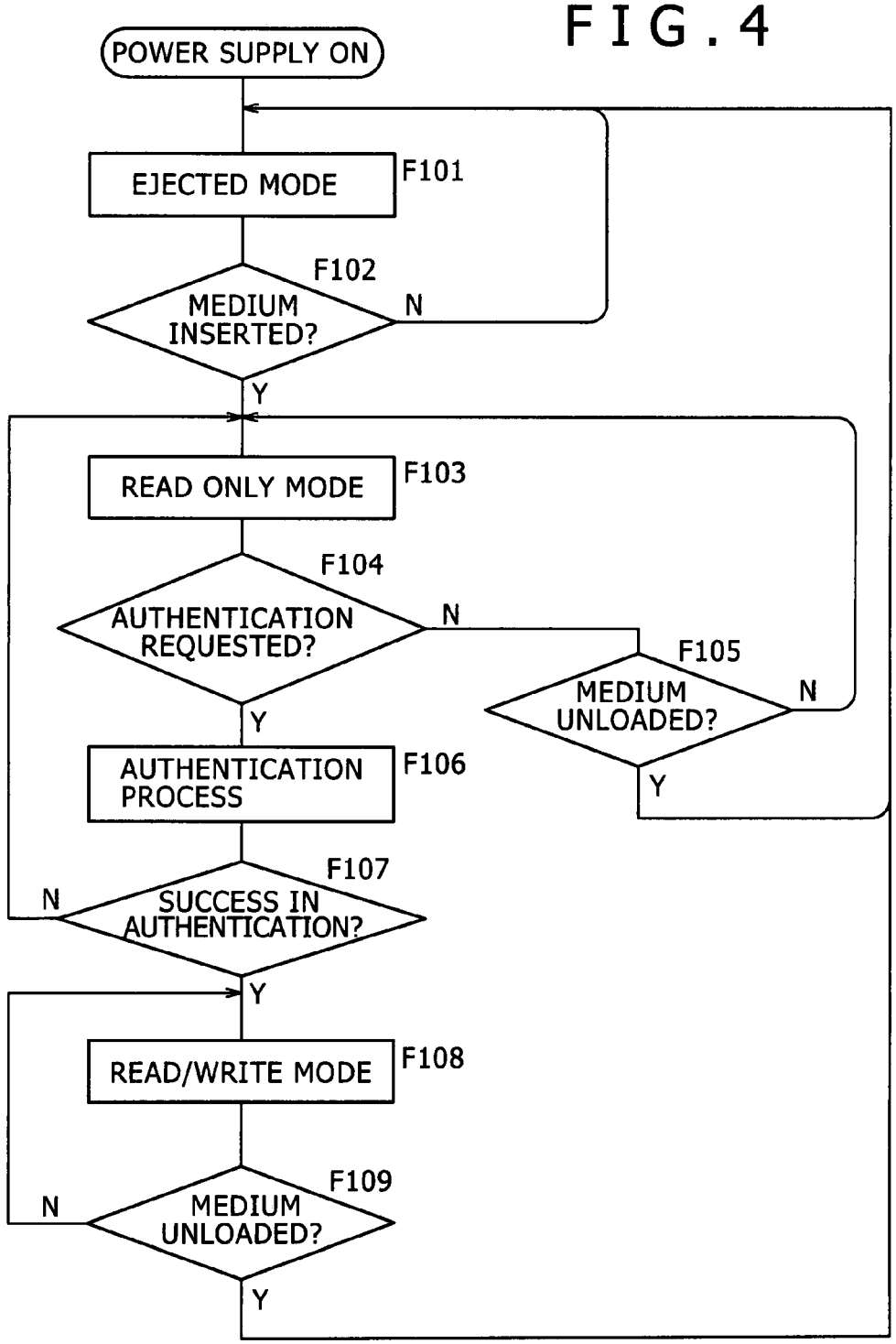
FIG. 4 is a flow chart of a process of a controller of the optical disk drive.

Meanwhile, operation which the optical disk drive 6 performs in accordance with a process illustrated in FIG. 4 corresponds to an embodiment of the present invention of an operation method for a medium drive apparatus, and a program (firmware program) for causing the process of FIG. 4 to be executed corresponds to an embodiment of the present invention of a program. Further, a recording medium on which the firmware program is recorded corresponds to an embodiment of the present invention of a program recording medium.

Figure 5:
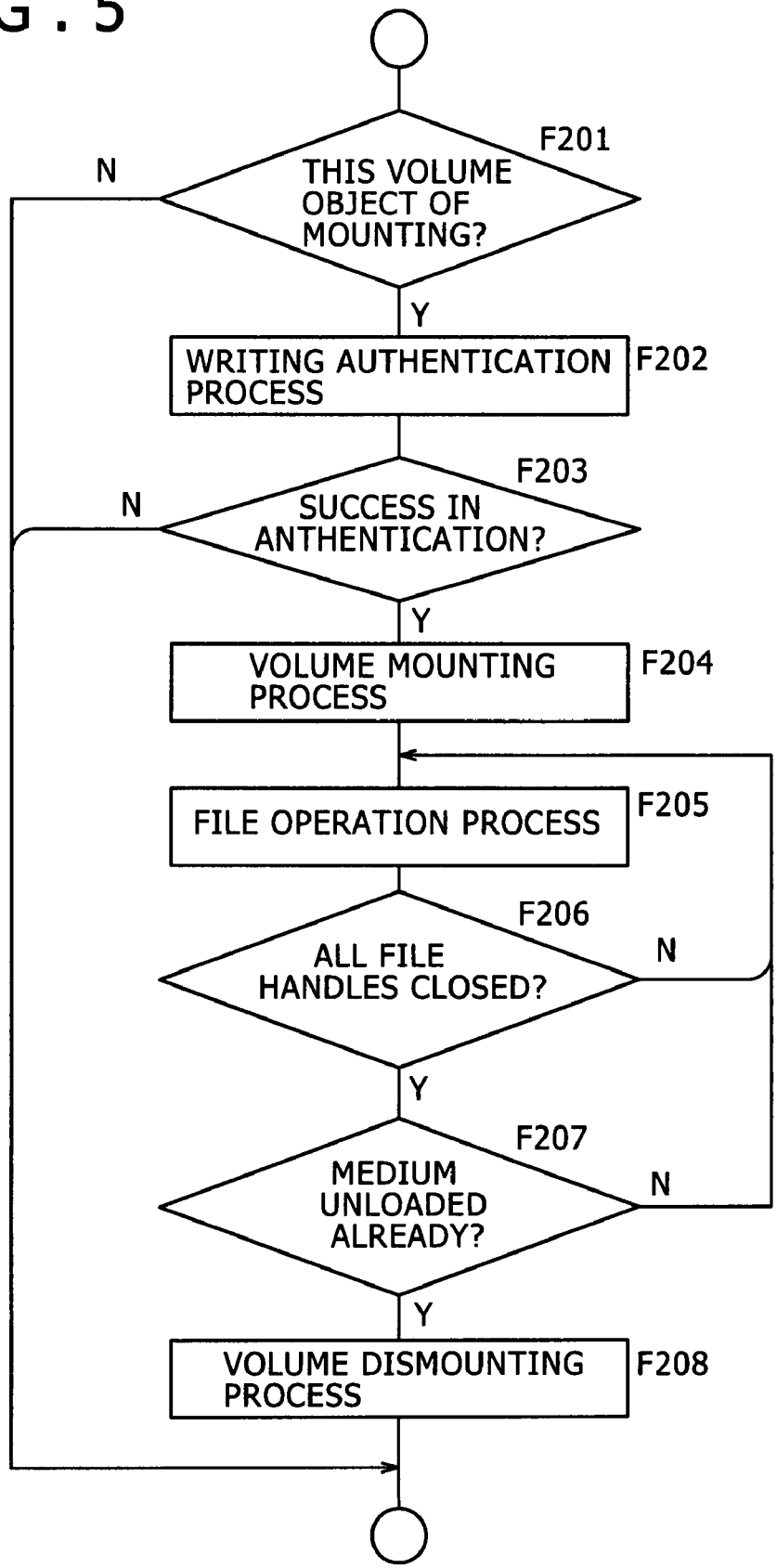
FIG. 5 is a flow chart illustrating a process of a UDF driver for exclusive use shown in FIG. 2.

On the other hand, operation performed based on the process of FIG. 5 by the CPU 1 corresponds to an embodiment of the present invention of a recording and reproduction accessing method for an information processing apparatus. Further, a program for causing the process of FIG. 5, that is, an OS (operating system) including a UDF driver 22 for exclusive use hereinafter described corresponds to an embodiment of the present invention of a program. Furthermore, a recording program on which the program as the OS including the UDF driver 22 for exclusive use is recorded corresponds to an embodiment of the present invention of a program recording medium.

The optical disk drive 6 performs recording/reproduction on/from an optical disk 7 and includes a bus interface 8, a cache memory 9, a medium input/output control section 10 and a controller 11.

The optical disk drive 6 can record or reproduce, for example, AV data of a high bit rate on the real time basis.

The optical disk drive 6 may have, for example, a form wherein it is built in a housing of a computer apparatus or the like which forms the information processing system 20 or another form wherein it is formed as a separate apparatus and connected by a predetermined interface cable or the like.

The medium input/output control section 10 includes an optical pickup, a spindle mechanism, a servo mechanism, an encoder, a decoder and so forth and actually performs recording/reproduction of data on/from the optical disk 7.

The controller 11 performs necessary control based on a program as driving firmware. For example, a logical/physical address exchanging function and a host I/O providing function are implemented by the firmware program and control recording and reproduction operation of the medium input/output control section 10 in accordance with a command from the CPU 1 serving as a host apparatus. The controller 11 executes a process of FIG. 4 hereinafter described in accordance with the firmware program. Therefore, the controller 11 has an operation controlling function in various modes including an ejected mode, a reproduction only mode and a recording/reproduction mode hereinafter described, a mode changing function and an authentication function with the host apparatus.

The cache memory 9 performs cache storage of data read out from the optical disk 7.

The bus interface 8 performs transmission and reception of data and commands to and from the CPU 1 serving as a host apparatus through the ATA bus 5.

It is to be noted that, while the optical disk drive 6 is described as an example of a medium drive apparatus, the type of the optical disk 7 is not limited particularly. In other words, the optical disk drive 6 can be implemented as recording and/or reproduction apparatus ready for various optical disks. Further, the optical disk 7 may be, or may be replaced by, various other recording media than optical disks such as magnetic disks, magneto-optical disks, memory cards in which a flash memory or the like is built and hologram media, and the medium drive apparatus may be formed as a recording and/or reproduction apparatus ready for a medium to be adopted.

Meanwhile, the firmware program as an operation program for the controller 11 in the optical disk drive 6 may be stored in advance, for example, in a ROM or a nonvolatile memory in the controller 11. Or, the firmware program may be stored or recorded temporarily or permanently in a removable recording medium such as a flexible disk, a CD-ROM (Compact Disc Read Only Memory), an MO (Magneto-Optical) disk, a DVD (Digital Versatile Disc), a magnetic disk or a semiconductor memory. Such a removable recording medium as just described may be provided as package software.

Further, the firmware program may be installed into the optical disk drive 6 of the information processing system 20 in the present embodiment from such a removable recording medium as described above or may be transferred from a download site into the information processing system 20 by radio communication through an artificial satellite for digital satellite broadcasting or through a network such as a LAN (Local Area Network) or the Internet.

The OS (Operating System) and an application (program) are activated by the CPU 1, and the CPU 1 executes the application to perform various processes under the control of the OS.

The CPU 1 is connected to the main memory 3 through the I/O bridge 2. The main memory 3 has a storage area as a nonvolatile memory such as a ROM (Read Only Memory), a RAM (Random Access Memory) or a flash memory and is used by the CPU 1.

Further, the CPU 1 transmits and receives commands and data to and from the optical disk drive 6 or the hard disk drive 12 connected to the ATA bus 5 through the bus interface 4.

For example, the CPU 1 executes a program stored in the ROM of the main memory 3 in response to an input of a user through an inputting apparatus such as a keyboard, a mouse, a microphone and so forth connected thereto through an input/output interface not shown.

Or, the CPU 1 loads a program stored in the hard disk drive 12, a program transferred from a satellite or a network, received by a communication section not shown in FIG. 1 and installed in the hard disk drive 12 or a program read out from a removable recording medium such as the optical disk 7 loaded in the optical disk drive 6 and installed in the hard disk drive 12 into the RAM of the main memory 3 and executes the program.

Then, the CPU 1 outputs a result of processing based on the program from an outputting section formed, for example, from a liquid crystal display (LCD) panel, a speaker or the like not shown as occasion demands. Or, as occasion demands, the CPU 1 executes such a process as to cause such a processing result as described above to be transmitted from a communication section, to be recorded on the hard disk drive 12, to be recorded on the optical disk 7 by the optical disk drive 6 or the like.

Here, while the CPU 1 executes the OS and various application programs, the OS or a program as an application can be recorded in advance in the hard disk drive 12 as a recording medium built in the present system, the ROM in the main memory 3 or the like.

Or else, the program may be recorded or retained temporarily or permanently on a removable recording medium such as a flexible disk, a CD-ROM (Compact Disc Read Only Memory), an MO (Magneto-Optical) disk, a DVD (Digital Versatile Disc), a magnetic disk or a semiconductor memory. Such a removable recording medium may be provided as package software.

It is to be noted that the program may be installed into the information processing system of the present embodiment from such a removable recording medium as described above or may be transferred from a download site into the information processing system of the present embodiment by radio communication through an artificial satellite for digital satellite broadcasting or transferred by wire communication to the information processing system through a network such as a LAN (Local Area Network) or the Internet. The information processing system can receive and install the program transferred in this manner into the built-in HDD 12.

Then, for example, if it is assumed that the OS and the application program (program) are installed at least in the hard disk drive 12, then after the information processing system is activated in response to turning on of the power supply, the CPU 1 loads the OS into the RAM of the main memory 3 from the hard disk drive 12 and then executes the OS. Further, if it is assumed that, if a request to activate a certain application is issued, for example, through an inputting operation of the user, then the CPU 1 loads the application into the RAM from the hard disk drive 12 and executes the application under the control of the OS.

Then, if the application executes, for example, an access request, which relates to a file operation for the optical disk 7 loaded in the optical disk drive 6, then the OS processes the access request. Consequently, data whose recording is requested by the access request from the application are recorded on the optical disk 7 by the optical disk drive 6. Or, data whose reading out is requested by the access request from the application are read out from the optical disk 7 and passed to the application by which the access request is issued through the OS.

It is to be noted that, while various applications may be installed into the hard disk drive 12 and executed by the CPU 1, a representative one of such applications to use the optical disk drive 6 is an AV application for fetching AV data and performing editing, recording, reproduction and so forth of AV data. Naturally, for example, an application for performing editing of text data and so forth or an application for displaying a file (for example, a file utility such as "explorer" or "file manager") may be used as the application.

Meanwhile, as the OS, for example, an OS called Unix (registered trademark), Linux, or Windows (registered trademark) of Microsoft or any other arbitrary OS may be adopted.

Figure 2:
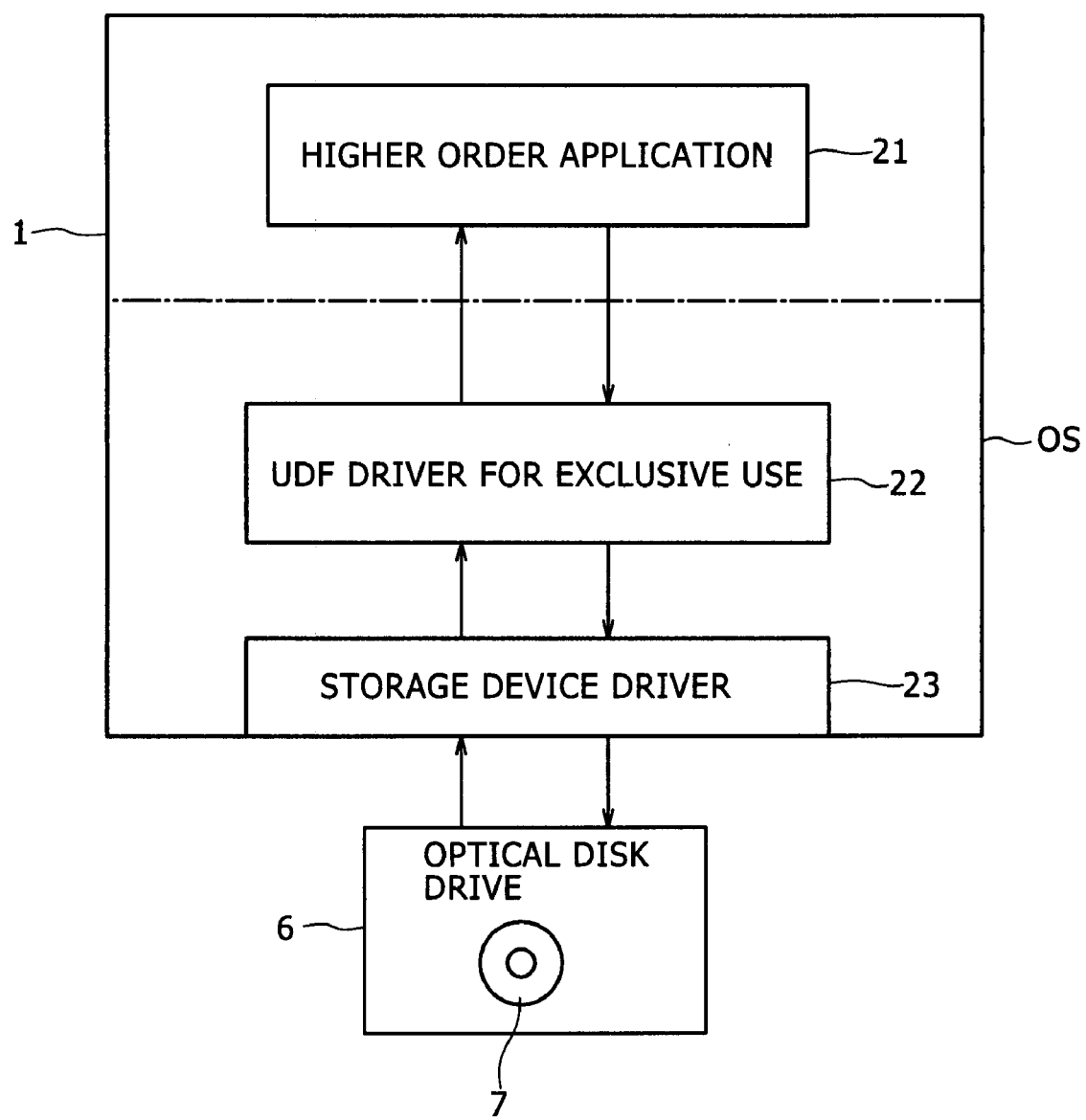
FIG. 2 is a diagrammatic view illustrating a program of a CPU shown in FIG. 1.

FIG. 2 shows the example of the system of the present embodiment represented as a model. Here, it is assumed that the UDF driver 22 for exclusive use which can write the optical disk 7, which is recorded or reproduced on the optical disk drive 6, is installed as software which operates on the CPU 1 shown in FIG. 1. The UDF driver 22 for exclusive use is a file system driver. Further, the UDF driver 22 for exclusive use is a software component which is executed in a process access mode in a kernel mode and incorporated in the OS (Operating System) and provides a file input/output interface of system standards to the application.

The "exclusive use" signifies that the UDF driver 22 for exclusive use is designed such that it can execute recording accessing for the optical disk 7, which is a particular medium, in a predetermined file system format. In other words, the UDF driver 22 for exclusive use can convert a file writing instruction from a higher order application 21, which operates on the same CPU 1, into a writing command of a file system according to the predetermined format on the optical disk 7 and issues the writing command.

Further, the UDF driver 22 for exclusive use has a function of performing an authentication process with the optical disk drive 6 hereinafter described. The authentication process is a process for establishing a state wherein an access request (write command or the like) which involves recording can be accepted by the optical disk drive 6.

The storage device 23 is a device I/O providing module and converts a reading or writing instruction accessed by logical address designation from a higher order apparatus (in this instance, the UDF driver 22 for exclusive use) into a SCSI (Small Computer System Interface) command, an ATAPI command or a like command. Then, the storage device 23 issues the resulting command to the optical disk drive 6 which is a device.

Figure 3:
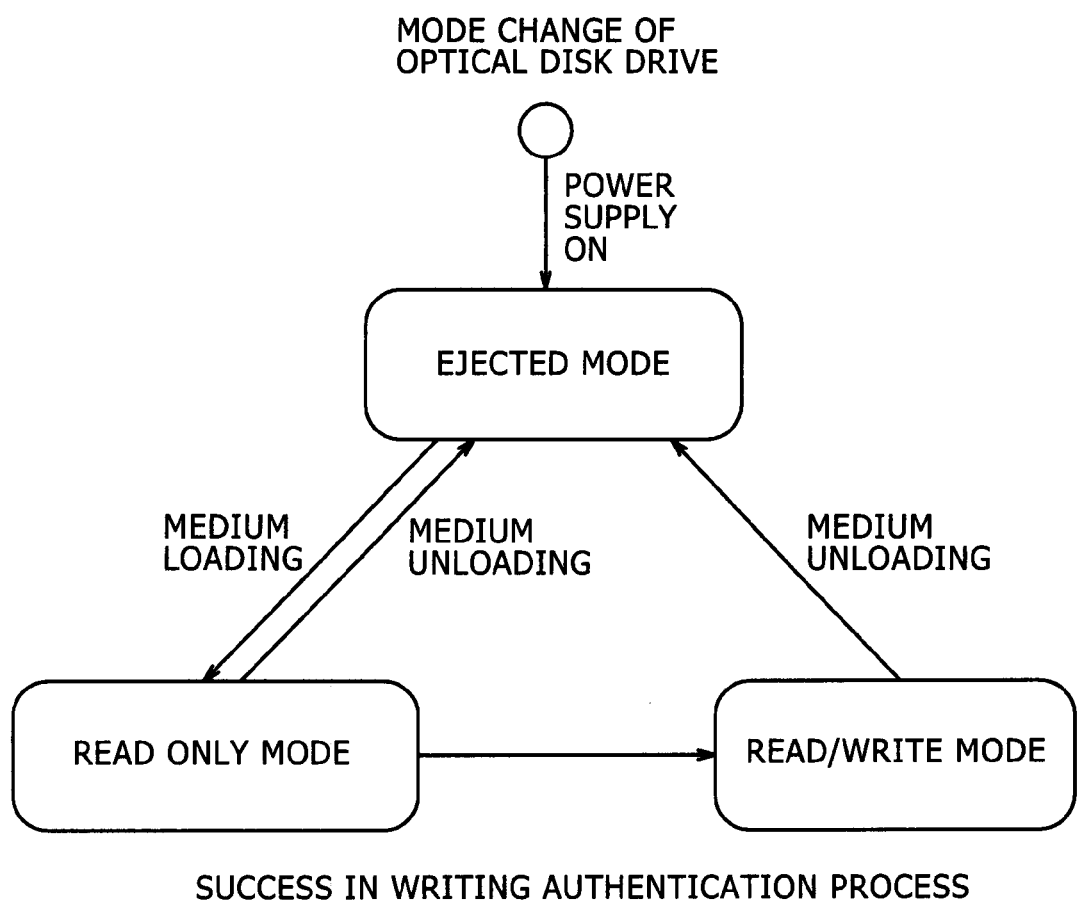
FIG. 3 is a flow diagram illustrating a mode change scheme of an optical disk drive shown in FIG. 1.

Now, mode change of the optical disk drive 6 is described with reference to FIG. 3.

The optical disk drive 6 (controller 11) in the present embodiment has three operation modes including an ejected mode (EJECTED Mode), a read only mode (READ ONLY Mode) and a read/write mode (Read/Write ENABLE Mode).

The controller 11 enters the ejected mode in response to turning on of the power supply.

However, in response to insertion of a medium (optical disk 7), the operation mode changes from the ejected mode to the read only mode.

Further, when authentication is established between the optical disk drive 6 and the host apparatus in the read only mode, the operation mode changes to the read/write mode.

Further, the operation mode changes from the read only mode or read/write mode to the ejected mode when a medium is ejected.

A process of controller 11 which involves such mode change is illustrated in FIG. 4.

Referring to FIG. 4, if the power supply to the optical disk drive 6 is turned on, then the controller 11 first enters the ejected mode at step F101.

However, if the power supply is turned on in a state wherein an optical disk 7 is loaded already, then the controller 11 enters the read only mode immediately from the ejected mode (step F101→step F102→step F103).

The ejected mode corresponds to a case wherein the optical disk 7 is not loaded. Where the controller 11 is in the ejected mode at step F101, the controller 11 performs a process of notifying the host apparatus of an error in response to an access command to any medium (optical disk 7) beginning with the read command or the write command from the host apparatus (CPU 1).

If the controller 11 detects in the ejected mode that an optical disk 7 is loaded into the optical disk drive 6, then the controller 11 advances the processing from step F102 to step F103, at which it now establishes the read only mode.

In the read only mode, while a reproduction operation for the optical disk 7 is executed in accordance with a read command (reproduction request) from the host apparatus, a recording operation for the optical disk 7 is not executed in response to a write command (recording request).

In particular, if a command which does not involve writing on the optical disk 7 beginning with a read command is supplied from the host apparatus to the controller 11 within a period within which the read only mode is effective, then the controller 11 performs control of executing an operation in accordance with the command such as reproduction of the optical disk 7 and then returns data produced as a result of the executed control or a necessary response to the host apparatus at step F103. For example, as viewed from the host apparatus side, the read only mode is a state wherein it can read in a file system or data of the optical disk 7.

However, even if the host apparatus issues a request which involves recording on the optical disk 7 such as a write command, the controller 11 does not execute a processing operation based on the request but returns an error notification to the host apparatus side.

Where the host apparatus includes the UDF driver 22 for exclusive use as seen in FIG. 2, the controller 11 performs an authentication process with a device when a mounting process of the device is performed. In particular, an authentication request is issued to the optical disk drive 6 as the device.

On the other hand, where the host apparatus connected to the optical disk drive 6 does not include the UDF driver 22 for exclusive use which executes an authentication process, no authentication request is issued.

Therefore, in the read only mode, the controller 11 supervises issuance of an authentication request at step F104 and supervises unloading of a medium at step F105.

If the optical disk 7 is unloaded without issuance of an authentication request, then the controller 11 returns the processing to step F101, at which it establishes the ejected mode.

If an authentication request is received from the host apparatus while the controller 11 is in the read only mode, then the controller 11 advances the processing from step F104 to step F106, at which it performs an authentication process with the host apparatus (UDF driver 22 for exclusive use). The authentication process is hereinafter described with reference to FIG. 6.

Then, if the authentication results in failure, then the processing returns from step F107 to step F103, at which the read only mode is continued. However, if the authentication results in success, then the processing advances from step F107 to step F108, at which the read/write mode is established.

In the read/write mode, not only a reproduction operation for the optical disk 7 is executed in accordance with a read command (reproduction request) from the host apparatus but also a recording operation on the optical disk 7 is executed in accordance with a write command (recording request) from the host apparatus. In short, in the read/write mode, basically a control process is executed in accordance with a command from the host apparatus irrespective of whether or not writing on the optical disk 7 is involved.

In particular, within a period within which the read/write mode established at step F108 continues, the controller 11 executes processing in accordance with all commands including the write command.

Naturally, an error notification may be returned to the host apparatus because a process may not be executed appropriately. However, this is an error according to a result of execution of the process. An error notification with regard to a write command in the read only mode is returned without execution of a write process, and in this regard, the error is different in significance in the controller 11.

In the read/write mode, the controller 11 supervises unloading of the optical disk 7 at step F109, and if the optical disk 7 is unloaded, then the controller 11 returns the processing to step F101, at which the ejected mode is established again.

In this manner, whereas the optical disk drive 6 in the present embodiment uses the read only mode or the read/write mode within a period within which an optical disk 7 is loaded therein, the read/write mode is used when an authentication results in success between the optical disk drive 6 and the host apparatus side.

In other words, the optical disk drive 6 functions as a reproduction only disk drive as long as an authentication remains in failure, but functions as a recording and reproduction disk drive when an authentication results in success.

Now, a process of the host apparatus as an information processing apparatus in the present embodiment, that is, a process of the UDF driver 22 for exclusive use shown in FIG. 2, is described with reference to FIG. 5.

If an optical disk 7 is loaded into the optical disk drive 6 connected to the UDF driver 22 for exclusive use, then the UDF driver 22 for exclusive use sends a mounting request to the UDF driver 22 for exclusive use. A trigger to the mounting request is issued, for example, in response to detection of an unmounted volume through periodical issuance of a "TEST UNIT READY" command or the like to all storage devices recognized by the OS.

Therefore, the UDF driver 22 for exclusive use may receive also a mounting request to a volume which is not an object of mounting, that is, a different optical disk medium or a different drive. Therefore, when a mounting request is generated, the UDF driver 22 for exclusive use checks at step F201 whether or not a device/medium of an object of the mounting request is applicable to a mounting object. If the object device/medium is not applicable, then the UDF driver 22 for exclusive use ends its processing without mounting on the volume. It is to be noted that the volume in this instance may possibly become an object of mounting by some other driver later.

Upon mounting request, if the volume is an object of the mounting, then the UDF driver 22 for exclusive use advances the processing to step F202, at which it tries a writing authentication. The writing authentication is an authentication process with the optical disk drive 6 as described hereinabove and is performed in order to change the operation mode of the optical disk drive 6 to the read/write mode.

If the authentication results in failure, then the UDF driver 22 for exclusive use ends its processing after step F203. In other words, the UDF driver 22 for exclusive use gives up the mounting. It is to be noted that, if the authentication results in failure, then the volume may alternatively be mounted as a device for reading only.

If the authentication process results in success, then the processing advances from step F203 to step F204, at which the UDF driver 22 for exclusive use is mounted as a file system driver of the volume.

Thereafter, the UDF driver 22 for exclusive use executes a file operation process from an application which involves writing for the mounted volume in accordance with a predetermined file system format at step F205. The file operation process is actually performed by concurrent processing.

In short, at step F205, the optical disk drive 6 is used as a recording and reproduction device by the CPU 1.

If it is detected that all file handles opened by the file operation process at step F205 are closed and the medium is unloaded from the optical disk drive, then the processing of the UDF driver 22 for exclusive use advances through steps F206→F207→F208, at which an unmounting process is performed, and then the file input/output service for the volume is ended.

Figure 6:
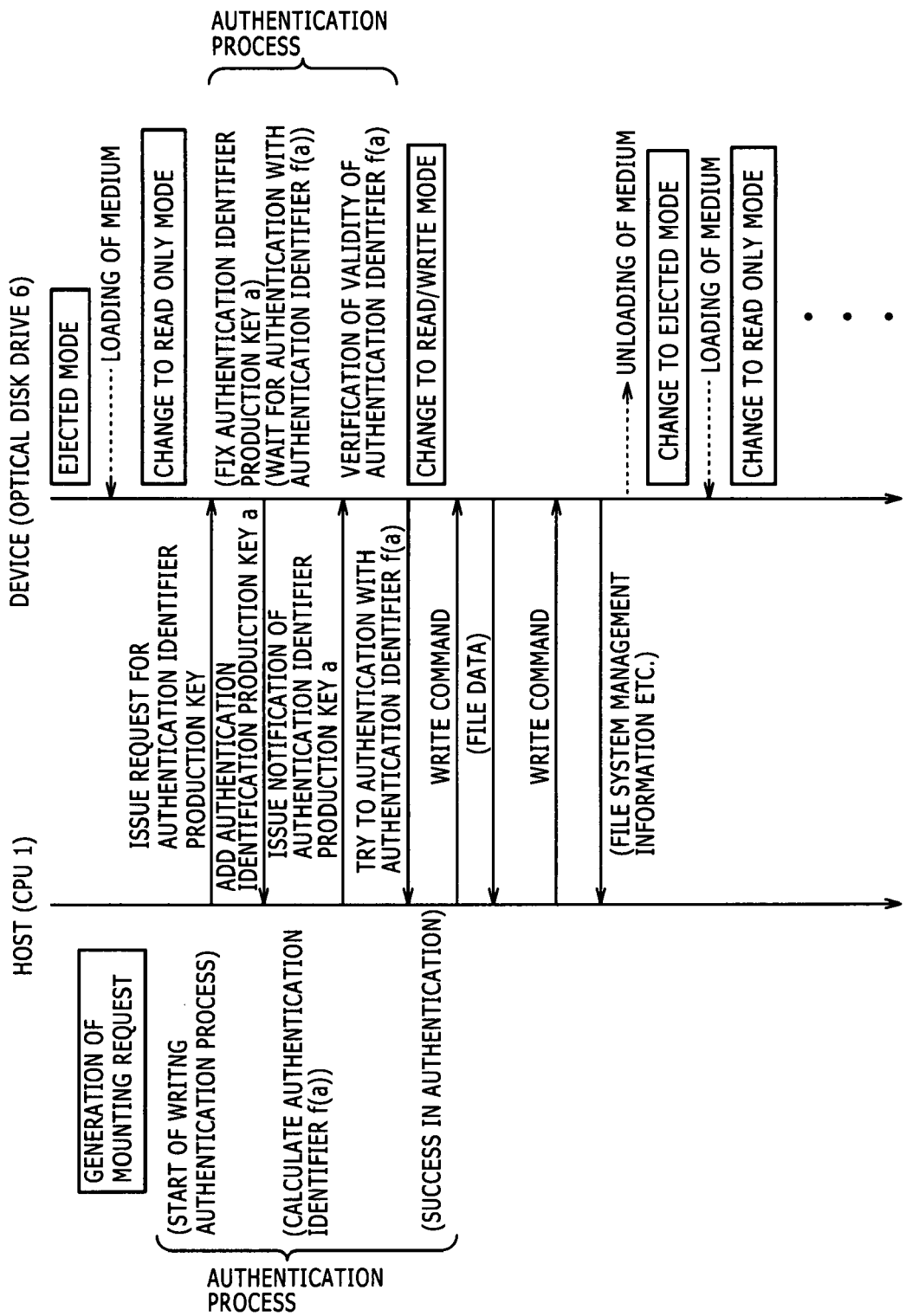
FIG. 6 is a flow diagram illustrating operation of the host side and the device side shown in FIG. 1.

A flow of processes executed, where the process of the UDF driver 22 for exclusive use described above with reference to FIG. 5 and the process of the controller 11 of the optical disk drive 6 described hereinabove with reference to FIG. 4 are performed, after an optical disk 7 is loaded into the optical disk drive 6 until it is unloaded and further after the UDF driver 22 for exclusive use is mounted on the volume until it is unmounted is illustrated in FIG. 6. Here, an example of an authentication process is described particularly.

The optical disk drive 6 changes the operation mode from the ejected mode to the read only mode in response to loading of a medium (optical disk 7).

The host apparatus (CPU 1) generates a mounting request, and the UDF driver 22 for exclusive use starts a writing authentication instruction in response to the mounting request.

It is presupposed here that the optical disk drive 6 on the device side and the UDF driver 22 for exclusive use on the host side have a common authentication identifier production function f(x). The common authentication identifier production function f(x) is known to the optical disk drive 6 and the UDF driver 22 for exclusive use.

First, the UDF driver 22 for exclusive use issues an inquiry about the value of "x" which makes a production key (parameter) for the common authentication identifier production function f(x) to the optical disk drive 6 which is in the read only mode. The optical disk drive 6 determines the value "x" based on an internal random number (here "a" is used) and notifies the host apparatus of this value. Then, the UDF driver 22 for exclusive use waits that an authentication is performed with the authentication identifier f(a) in which the production key is used.

The UDF driver 22 for exclusive use produces an authentication identifier f(a) from the production key "a" received from the optical disk drive 6 and tries to perform authentication with the optical disk drive 6 side using the authentication identifier f(a).

The optical disk drive 6 confirms that the authentication request from the host apparatus is based on the identifier f(a) and notifies the host apparatus side of success in authentication. The optical disk drive 6 itself now enters the read/write mode.

When the notification of the success in authentication is received, the UDF driver 22 for exclusive use performs a volume mounting process as described hereinabove with reference to FIG. 5.

After the authentication process is executed in this manner, the optical disk drive 6 operates as a device which can perform writing. In particular, the optical disk drive 6 is enabled to thereafter execute an operation of writing file data, file system management information and so forth to the optical disk 7 in accordance with the write command from the host side as seen from FIG. 6.

It is to be noted that the optical disk drive 6 changes the operation mode back into the ejected mode in response to unloading of the medium as seen in FIG. 6, and thereafter, in response to loading of a medium, the optical disk drive 6 enters the read only mode. In this instance, an authentication process is performed again, and consequently, the optical disk drive 6 enters the read/write mode.

As can be recognized from the description above, if, in a state of FIG. 7A wherein the optical disk drive 6 according to the present embodiment is connected to the information processing system 20 according to the present embodiment, an authentication process is executed and results in success, then the optical disk drive 6 thereafter functions as a device which can perform both of recording and reproduction. Consequently, the optical disk drive 6 permits a recording access and a reproduction access from the application 21 through the UDF driver 22 for exclusive use.

On the other hand, if an authentication process is not performed, then the optical disk drive 6 functions in the read only mode. In other words, even if an authentication process is not performed, the optical disk drive 6 functions as a reproduction only drive which accepts a command of the reading out type.

For example, a CPU 41 of an information processing apparatus 40 in FIG. 7B includes a general-purpose UDF driver 42 and a storage device driver 43. The general-purpose UDF driver 42 does not have a function of FIG. 5 executed by the UDF driver 22 for exclusive use in the present embodiment, that is, the authentication processing function for the optical disk drive 6. Accordingly, in this instance, the optical disk drive 6 normally remains in the read only mode within a period within which an optical disk 7 is loaded therein, but does not enter the read/write mode at all.

However, if the format used for writing of the optical disk 7 allows reading out, for example, by the general-purpose UDF driver 42, then also in the system of FIG. 7B, the general-purpose UDF driver 42 can be mounted on the volume without any trouble.

In this instance, although the general-purpose UDF driver 42 can provide a file reading out service to the application 21, since writing is rejected by the optical disk drive 6 side, even if a request for writing is received from the application 21, this makes an error with the general-purpose UDF driver 42.

As described above, according to the present embodiment, unless an authentication results in success, the optical disk drive 6 operates in the read only mode, but operates in the read/write mode after the condition of success in authentication is satisfied. Therefore, an information processing apparatus which includes the UDF driver 22 for exclusive use which performs a recording access in a predetermined format to a particular medium (optical disk 7 of the particular type) is permitted to perform recording and reproduction operations. On the other hand, another information processing apparatus which includes the general-purpose UDF driver 42 which does not perform a recording apparatus in the predetermined format is permitted to perform a reproduction operation.

Accordingly, there is an effect that the format of information to be written on the optical disk 7 loaded in the optical disk drive 6 can be specified.

Further, even the information processing apparatus which incorporates the general-purpose UDF driver 42 can use the optical disk drive 6 to perform a reproduction access to the optical disk 7 and can read out data on the optical disk 7.

While an embodiment of the present invention is described above, the information processing apparatus and the recording and reproduction accessing method for an information processing apparatus of the present invention can be applied widely to a variety of electronic apparatus which access various recording media such as an optical disk 7 such as computer apparatus including personal computers, AV apparatus, PDAs (Personal Digital Assistants), portable telephone sets and navigation apparatus.

Further, where the program and the program recording medium of the present invention are used, the information processing apparatus and the recording and reproduction accessing method for an information processing apparatus of the present invention can be developed, implemented and spread suitably.

Further, the medium drive apparatus and the operation method for a medium drive apparatus of the present invention can be applied to medium drive apparatus for a portable recording medium including various optical disk drives, opto-magnetic disk drives, magnetic disk drives, tape medium drives and memory card drives and further to medium drive apparatus for media of the built-in type such as HDDs and solid-state memories. Further, where the program and the program recording medium of the present invention are used, the medium drive apparatus and the operation method for a medium drive apparatus of the present invention can be developed, implemented and spread suitably.

While a preferred embodiment of the present invention has been described using specific terms, such description is for illustrative purpose only, and it is to be understood that changes and variations may be made without departing from the spirit or scope of the following claims.

The invention claimed is:

1. A medium drive apparatus connectable to an information processing apparatus for performing recording and reproduction on and from a recording medium in accordance with a request from the information processing apparatus, comprising:

an inputting and outputting section, including a pickup device, configured to record and reproduce data on and from a recording medium; and a controller configured to execute a plurality of processes to control the recording operation and the reproduction operation of said inputting and outputting section, the processes including:

a first operation process as a reproduction only mode wherein a reproduction operation for the recording medium in accordance with a reproduction request from the information processing apparatus is executed but a recording operation on the recording medium in accordance with a recording request from the information processing apparatus is not executed, a second operation process as a recording and reproduction mode wherein a reproduction operation and a recording operation from and on the recording medium in accordance with a reproduction request and a recording request from the information processing apparatus are executed, an authentication process with the information processing apparatus, in which the authentication process determines whether an access request or write command for allowing recording is acceptable, and a mode changing process of changing the operation mode from the reproduction only mode to the recording and reproduction mode in response to success in the authentication by the authentication process, in which the authentication process executed by the controller includes determining an authentication identifier key based on an internal random number in response to a request received from the information processing apparatus, notifying the information processing apparatus of the authentication identifier key, and verifying validity of a received authentication identifier produced by the information processing apparatus from the authentication identifier key, in which in response to turning on power to the medium drive apparatus and insertion of the recording medium, the controller causes the first operation process to be executed without performing the authentication process such that the medium drive apparatus is automatically placed in the reproduction or read only mode when the power is applied thereto and the recording medium is inserted, and in which in response to a failure in the authentication by the authentication process when the operation mode is in the reproduction only mode, the operation mode continues in the reproduction only mode.

2. The medium drive apparatus according to claim 1, wherein the recording medium is a portable recording medium.

3. An operation method for a medium drive apparatus connected to an information processing apparatus for performing recording and reproduction on and from a recording medium in accordance with a request from the information processing apparatus, comprising:

performing an operation as a reproduction only mode wherein a reproduction operation for the recording medium in accordance with a reproduction request from the information processing apparatus is executed but a recording operation on the recording medium in accordance with a recording request from the information processing apparatus is not executed;

performing an authentication process with the information processing apparatus, in which the authentication process determines whether an access request or write command for allowing recording is acceptable; and changing operation mode from the reproduction only mode to a recording and reproduction mode in response to success in authentication by the authentication process to perform the recording operation and the reproduction operation on and from the recording medium in accordance with the reproduction request and the recording request from the information processing apparatus, in which the authentication process includes determining an authentication identifier key based on an internal random number in response to a request received from the information processing apparatus, notifying the information processing apparatus of the authentication identifier key, and verifying validity of a received authentication identifier produced by the information processing apparatus from the authentication identifier key, in which in response to turning on power to the medium drive apparatus and insertion of the recording medium, the operation as the reproduction only mode is performed without performing the authentication process such that the medium drive apparatus is automatically placed in the reproduction or read only mode when the power is applied thereto and the recording medium is inserted, and in which in response to a failure in the authentication by the authentication process when the operation mode is in the reproduction only mode, the operation mode continues in the reproduction only mode.

4. A computer readable memory having stored thereon an operation program for a medium drive apparatus connected to an information processing apparatus for performing recording and reproduction on and from a recording medium in accordance with a request from the information processing apparatus, the operation program causing the medium drive apparatus to performing:

performing an operation as a reproduction only mode wherein a reproduction operation for the recording medium in accordance with a reproduction request from the information processing apparatus is executed but a recording operation on the recording medium in accordance with a recording request from the information processing apparatus is not executed;

performing an authentication process with the information processing apparatus, in which the authentication process determines whether an access request or write command for allowing recording is acceptable; and changing operation mode from the reproduction only mode to a recording and reproduction mode in response to success in authentication by the authentication process to perform the recording operation and the reproduction operation on and from the recording medium in accordance with the reproduction request and the recording request from the information processing apparatus, in which the authentication process includes determining an authentication identifier key based on an internal random number in response to a request received from the information processing apparatus, notifying the information processing apparatus of the authentication identifier key, and verifying validity of a received authentication identifier produced by the information processing apparatus from the authentication identifier key, in which in response to turning on power to the medium drive apparatus and insertion of the recording medium, the operation as the reproduction only mode is performed without performing the authentication process such that the medium drive apparatus is automatically placed in the reproduction or read only mode when the power is applied thereto and the recording medium is inserted, and in which in response to a failure in the authentication by the authentication process when the operation mode is in the reproduction only mode, the operation mode continues in the reproduction only mode.

* * * * *